(12) United States Patent
Klingenberg et al.

(10) Patent No.: US 10,248,512 B2
(45) Date of Patent: Apr. 2, 2019

(54) INTELLIGENT DATA PROTECTION SYSTEM SCHEDULING OF OPEN FILES

(71) Applicant: INTERNATIONAL BUSINESS MACHINES CORPORATION, Armonk, NY (US)

(72) Inventors: Bernhard J. Klingenberg, Morgan Hill, CA (US); Ramani R. Routray, San Jose, CA (US); Alan C. Skinner, Portsmouth (GB); Yang Song, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 14/715,635

(22) Filed: May 19, 2015

(65) Prior Publication Data

US 2016/0342483 A1 Nov. 24, 2016

(51) Int. Cl.
*G06F 11/14* (2006.01)
(52) U.S. Cl.
CPC ...... *G06F 11/1461* (2013.01); *G06F 11/1451* (2013.01); *G06F 2201/80* (2013.01)
(58) Field of Classification Search
CPC .................................................. G06F 11/3409
See application file for complete search history.

(56) References Cited

U.S. PATENT DOCUMENTS

| | | | |
|---|---|---|---|
| 7,330,997 B1 * | 2/2008 | Odom | G06F 11/1464 711/162 |
| 7,552,214 B2 | 6/2009 | Venkatasubramanian | |
| 7,606,868 B1 * | 10/2009 | Le | G06F 17/30067 707/999.01 |
| 7,734,594 B2 | 6/2010 | Wang | |
| 8,533,818 B1 | 9/2013 | Ketterhagen et al. | |

(Continued)

OTHER PUBLICATIONS

"A system and a method for a dynamic and optimized time frame calculation for a machine backup in a virtualized environment"; An IP.com Prior Art Database Technical Disclosure; IP.com No. 000222156; IP.com Electronic Publication: Sep. 20, 2012; pp. 1-5.

(Continued)

*Primary Examiner* — Syling Yen
*Assistant Examiner* — Tony Wu
(74) *Attorney, Agent, or Firm* — William H. Hartwell (57) ABSTRACT

A method for scheduling one or more backup jobs among backup clients with a common backup window. The method includes collecting and recording historical information pertaining to the backup clients with the common backup window. An application then estimates the number of open files during the common backup window based on the historical information and infers an impact of skipping a backup of the open files during the common backup window, where the impact is inferred from the historical information according to one or more predetermined criteria. The estimated number of open files and the inferred impact of skipping the backup of the estimated number of open files during the common backup window are then combined according to a predetermined cost function. The order of the backup jobs for the backup clients during the common backup window is then scheduled to reduce the predetermined cost function.

20 Claims, 6 Drawing Sheets

(56) References Cited

U.S. PATENT DOCUMENTS

| | | | |
|---|---|---|---|
| 8,943,281 B1 * | 1/2015 | Stringham | G06F 11/1458 711/162 |
| 9,639,701 B1 * | 5/2017 | Barajas Vargas | G06F 3/062 |
| 2006/0200505 A1 | 9/2006 | Bhatia | |
| 2010/0017445 A1 * | 1/2010 | Kobayashi | G06F 11/1461 707/E17.01 |
| 2015/0142745 A1 * | 5/2015 | Tekade | G06F 11/1451 707/646 |

OTHER PUBLICATIONS

"Lagged Backup—A Method and System to Enable Backup/Achieve System Resource Usage Automatic Adjustment Over Time"; An IP.com Prior Art Database Technical Disclosure; IP.com No. 000203023; IP.com Electronic Publication: Jan. 16, 2011; pp. 1-9.

* cited by examiner

INTELLIGENT DATA PROTECTION SYSTEM SCHEDULING OF OPEN FILES

BACKGROUND

The present invention relates generally to the field of backup and restore, and more particularly to scheduling backup jobs among multiple backup clients with a common backup window.

In information technology, a backup, or the process of backing up, refers to the copying and archiving of computer data so the copied computer data may be used to restore the original data after a data loss event. Applications and hardware can fail regardless of how reliable a PC or server is, therefore a backup solution is vital in today's information age. Though once costly and complex, computer backups are now inexpensive, simple to use, and depending on the solution, completely automated. A well-developed data protection strategy is important in order to protect data, time, and/or money. The highest priorities of a data protection strategy are to keep data safe and to choose hardware and software that fits with a data protection strategy.

SUMMARY

Embodiments of the present invention disclose a method, computer program product, and system for scheduling one or more backup jobs among a plurality of backup clients with a common backup window. The method includes collecting and recording historical information pertaining to the plurality of backup clients with the common backup window, where the historical information includes a temporal pattern of a number of files open during previous backup jobs and information pertaining to subsequent additional backup jobs initiated by an administrator after the completion of the previous backup jobs. An application estimates a number of files to be open during the common backup window based, at least in part, on the historical information. Inferring an impact of skipping a backup of the files estimated to be open during the common backup window, where the impact is inferred from the historical information according to one or more predetermined criteria. Combining, according to a predetermined cost function, the estimated number of files to be open during the common backup window and the inferred impact of skipping the backup of the estimated number of files to be open during the common backup window. The backup jobs are then scheduled in an order among the plurality of clients during the common backup window to reduce the predetermined cost function.

DETAILED DESCRIPTION

Embodiments in accordance with the present invention recognize that intelligent data protection, leveraging historical and real-time information for multiple clients during the same scheduled backup window, can reduce the number of open files and impact of the backup process on the clients. In information technology, a backup, or the process of backing up, refers to the copying and archiving of computer data so it may be used to restore the original computer data after a data loss event. During the process of backing up a computer, it is very common to encounter files that are open, (i.e., they are currently in use by other applications and are locked), and thus cannot be backed up. Although usually the backup window is specified to avoid open files as much as possible (empirically, e.g., at mid-night), encountering certain number of open files is inevitable in practical backup systems, especially in enterprise IT environments where global teams are collaborating and other IT management processes are running in the background. In embodiments in accordance with the present invention, the backup process will skip open files and report how many open files were encountered during the backup job. This information is recorded and stored by the backup server into a database where reports may be generated for the backup administrator. The backup administrator may then read the outcome of the backup job to determine the number of open files encountered (i.e., skipped by backup process) and optionally initiate a manual backup job to backup those open files which were skipped by the originally scheduled automatic backup.

Figure 1:
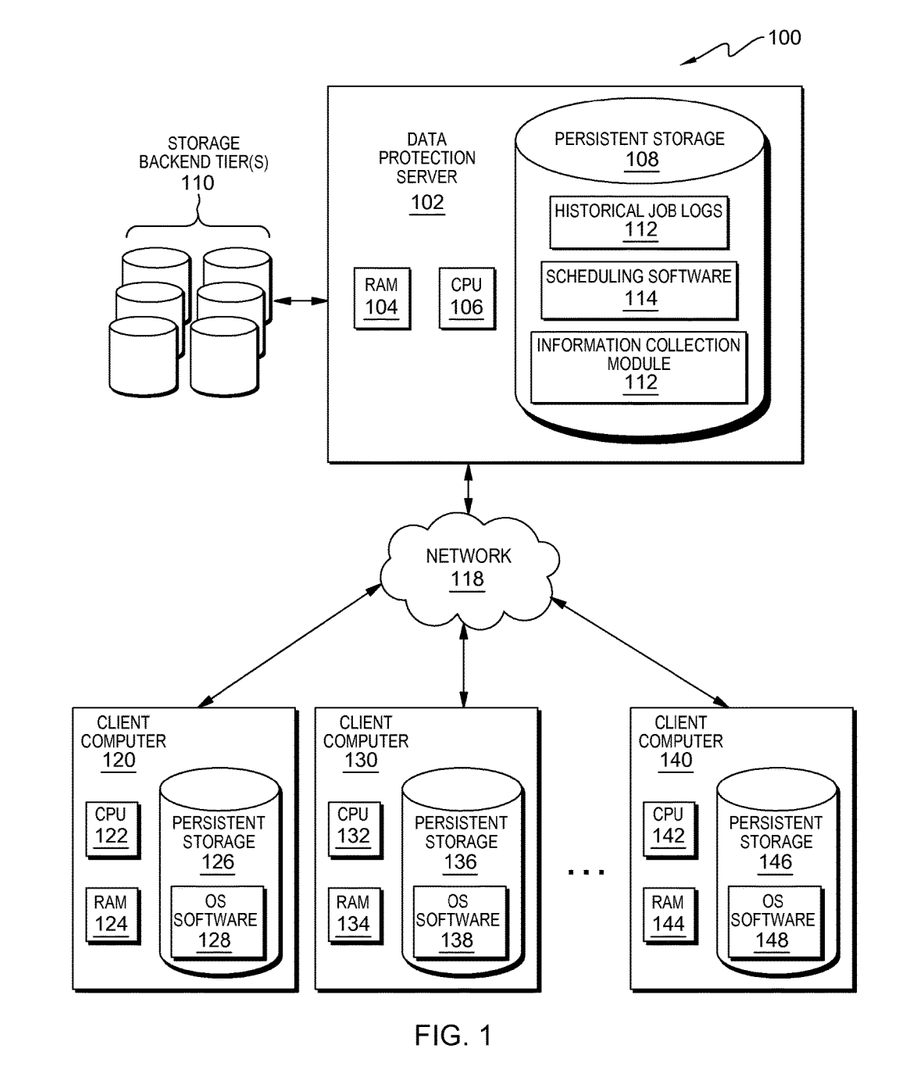
FIG. 1 is a functional block diagram illustrating a distributed data processing environment, in an embodiment in accordance with the present invention.

The present invention will now be described in detail with reference to the Figures. FIG. 1 is a functional block diagram, generally designated 100, illustrating a distributed data processing environment, in an embodiment in accordance with the present invention.

Distributed data processing environment 100 includes data protection server 102, storage backend tiers 110, client computer 120, client computer 130, and client computer 140, all interconnected over network 118. Data protection server 102 includes RAM 104, central processing unit 106, and persistent storage 108.

Data protection server 102 may be a Web server, or any other electronic device or computing system, capable of processing program instructions and receiving and sending data. In some embodiments, data protection server 102 may be a laptop computer, a tablet computer, a netbook computer, a personal computer (PC), a desktop computer, a personal digital assistant (PDA), a smart phone, or any programmable electronic device capable of communicating over a data connection to network 118. In other embodiments, data protection server 102 may represent server computing systems utilizing multiple computers as a server system, such as in a distributed computing environment. In general, data protection server 102 is representative of any electronic devices or combinations of electronic devices capable of executing machine-readable program instructions and communicating with storage backend tiers 110, client computer 120, client computer 130, and client computer 140 via network 118 and with various components and devices within distributed data processing environment 100.

Data protection server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Historical job logs 112, scheduling software 114, and information collection module 116 are stored in persistent storage 108, which also includes operating system software, as well as software that enables data protection server 102 to communicate with storage backend tiers 110, client computer 120, client computer 130, and client computer 140 over a data connection on network 118. Historical job logs 112 are stored in persistent storage 108 and contain historical information of past backup jobs for client computer 120, client computer 130, and client computer 140 (e.g., the number encountered open files during the scheduled backup window, or the administrator's activities after the subsequent backup). In one example embodiment, historical job logs 112 may be stored on a separate computer or repository within distributed data processing environment 100.

Scheduling software 114 is also included in persistent storage 108. Scheduling software 114 is responsible for scheduling backups on client computer 120, client computer 130, and client computer 140 and builds a statistical model of open file predictions for each client during scheduled backup windows. In one example embodiment, scheduling software 114 may schedule and initiate backups on client computer 120, client computer 130, and client computer 140 manually by an administrator using a command line interface or through a graphical user interface (GUI). In another example embodiment, scheduling software 114 may schedule and initiate backups on client computer 120, client computer 130, and client computer 140 through software applications using storage backend tiers 110. In other example embodiments, scheduling software 114 may reside on a separate computer system within distributed data processing environment 100.

Persistent storage 108 also includes information collection module 116. Information collection module 116 is used by scheduling software 114 to coordinate with client computer 120, client computer 130, and client computer 140 to make operating system queries to determine the number of open files on the systems at different sampling intervals. In one example embodiment, information collection module 116 queries client computer 120, client computer 130, and client computer 140 every 10 minutes between 3 am and 5 am. In other example embodiments, the interval at which information collection module 116 queries client computer 120, client computer 130, and client computer 140 may be tuned to provide performance tradeoffs between sampling accuracy and imposed overhead to data protection server 102. In other example embodiments, information collection module 116 may reside on a separate computer system within distributed data processing environment 100.

Storage backend tiers 110 are included in distributed data processing environment 100. Storage backend tiers 110, also known as tiered storage, are a data storage environment consisting of different types of storage media delineated by differences in price, performance, capacity and function. The types of storage media may be based on levels of data protection required, performance requirements, frequency of use, and other considerations. In one example embodiment, data intended for restoration in the event of data loss or corruption could be stored locally for fast recovery, while data for regulatory purposes could be archived to lower cost disks. In another example embodiment, storage backend tiers 110 may use expensive, high-quality media, such as double-parity redundant arrays of independent disks (RAID) to store data such as mission-critical, recently accessed, or confidential files. RAID, originally called redundant array of inexpensive disks, is a data storage virtualization technology that combines multiple disk drive components into a logical unit for the purposes of data redundancy or performance improvement. Data collected by data protection server 102, from client computer 120, client computer 130, and client computer 140 is stored in storage backend tiers 110. In other example embodiments, data collected by data protection server 102 may be stored only in data protection server 102, or on one or more devices in distributed data processing environment 100.

In FIG. 1, network 118 is shown as the interconnecting fabric between data protection server 102, client computer 120, client computer 130, and client computer 140. In practice, network 118 may be any viable data transport network. Network 118 can be, for example, a local area network (LAN), a wide area network (WAN) such as the Internet, or a combination of the two, and can include wired, wireless, or fiber optic connections. In general, network 118 can be any combination of connections and protocols that will support communications between data protection server 102, storage backend tiers 110, client computer 120, client computer 130, and client computer 140 in accordance with an embodiment of the invention.

Distributed data processing environment 100 also includes client computer 120. In the example embodiment of the present invention, client computer 120 is a device attached to network 118 and capable of communicating with data protection server 102, client computer 130, and client computer 140. Client computer 120 contains central processing unit (CPU) 122, RAM 124, and persistent storage 126. Persistent storage 126 may, for example, be a hard disk drive. Alternatively, or in addition to a magnetic hard disk drive, persistent storage 126 may include a solid state hard drive, a semiconductor storage device, read-only memory (ROM), erasable programmable read-only memory (EPROM), flash memory, or any other computer-readable storage medium that is capable of storing program instructions or digital information. Persistent storage 126 includes operating system software 128, as well as software that enables client computer 120 to communicate with data protection server 102, client computer 130, and client computer 140 over a data connection on network 118. In the example embodiment of the present invention, client computer 120 is a computer system executing a UNIX-like operating system using data protection server 102 as a backup server and interfacing with scheduling software 114 and information collection module 116 over a data connection on network 118.

Distributed data processing environment 100 also includes client computer 130. In the example embodiment of the present invention, client computer 130 is a device attached to network 118 and capable of communicating with data protection server 102, client computer 120, and client computer 140. Client computer 130 contains central processing unit (CPU) 132, RAM 134, and persistent storage 136. Persistent storage 136 may, for example, be a hard disk drive. Alternatively, or in addition to a magnetic hard disk drive, persistent storage 136 may include a solid state hard drive, a semiconductor storage device, read-only memory (ROM), erasable programmable read-only memory (EPROM), flash memory, or any other computer-readable storage medium that is capable of storing program instructions or digital information. Persistent storage 136, includes operating system software 138, as well as, software that enables client computer 130 to communicate with data protection server 102, and client computer 120, and client computer 140 over a data connection on network 118. In the example embodiment of the present invention, client computer 130 is a computer system executing a Windows® operating system using data protection server 102 as a backup server and interfacing with scheduling software 114 and information collection module 116 over a data connection on network 118. (Note: the term(s) "Windows" may be subject to trademark rights in various jurisdictions throughout the world and is used here only in reference to the products or services properly denominated by the marks to the extent that such trademark rights may exist.)

Distributed data processing environment 100 also includes client computer 140. In the example embodiment of the present invention, client computer 140 is a device attached to network 118 and capable of communicating with data protection server 102, client computer 120, and client computer 130. Client computer 140 contains central processing unit (CPU) 142, RAM 144, and persistent storage 146. Persistent storage 146 may, for example, be a hard disk drive. Alternatively, or in addition to a magnetic hard disk drive, persistent storage 146 may include a solid state hard drive, a semiconductor storage device, read-only memory (ROM), erasable programmable read-only memory (EPROM), flash memory, or any other computer-readable storage medium that is capable of storing program instructions or digital information. Persistent storage 146 includes operating system software 148, as well as software that enables client computer 140 to communicate with data protection server 102, and client computer 120, and client computer 130 over a data connection on network 118. In the example embodiment of the present invention, client computer 140 is a computer system executing an Ubuntu operating system using data protection server 102 as a backup server and interfacing with scheduling software 114 and information collection module 116 over a data connection on network 118. (Note: the term(s) "Ubuntu" may be subject to trademark rights in various jurisdictions throughout the world and is used here only in reference to the products or services properly denominated by the marks to the extent that such trademark rights may exist.) There can be many more client computers in distributed data processing environment 100.

Figure 2:
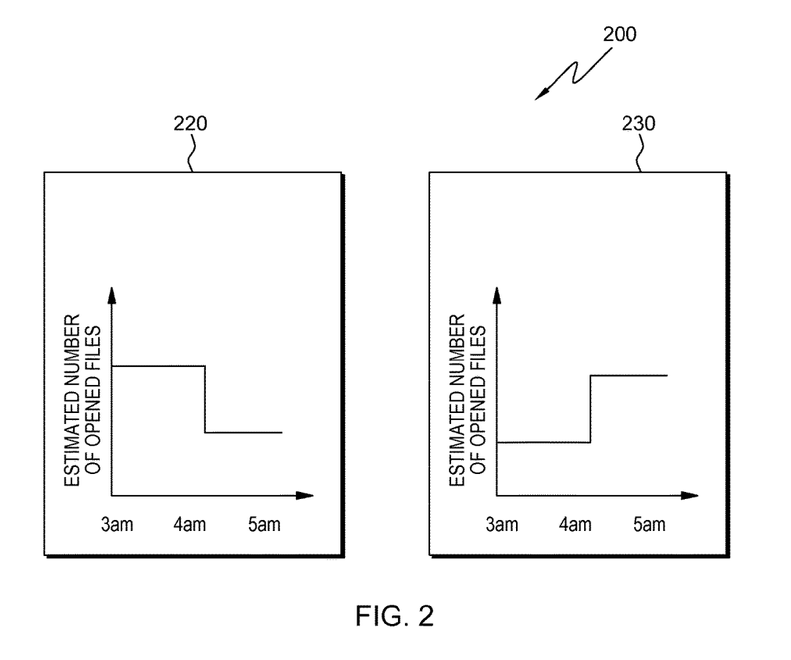
FIG. 2 includes time diagrams depicting the estimating of the number of open files on clients during a given time period within the data processing environment of FIG. 1, in an embodiment in accordance with the present invention.

FIG. 2 includes time diagrams, generally designated 200, depicting the estimating of the number of open files on clients during a given time period within the data processing environment of FIG. 1, in an embodiment in accordance with the present invention. Time diagram 220 shows an estimated number of open files on client computer 120 and time diagram 230 shows an estimated number of open files on client computer 130. Information collection module 116 in data protection server 102 coordinates with client computer 120, client computer 130, and client computer 140 to make operating system queries to determine the number of open files in the systems at different sampling intervals. The information collected is used to build a statistical model of the estimating of the number of open files on clients during the scheduled backup window. In one example embodiment, information collection module 116 may query, via a scheduled task, client computer 120, client computer 130, and client computer 140 every ten minutes between 3 am and 5 am. In another example embodiment, the interval in which information collection module 116 queries client computer 120, client computer 130, and client computer 140 may be configurable by an administrator to provide performance tradeoffs between sampling accuracy and imposed overhead to client computer 120, client computer 130, and client computer 140.

Information collected by information collection module 116 is stored in historical job logs 112 and is used to build statistical models for open file predictions of client computer 120, client computer 130, and client computer 140 during the backup window from 3 am to 5 am. In another example embodiment, the temporal pattern of the number of open files (e.g., the number, and frequency, of open files over a period of time), on client computer 120, client computer 130, and client computer 140 may be identified or determined by collecting historical data continuously over a period of seven days before generating statistical models. This would allow data protection server 102 to utilize collected data to build temporal pattern estimations for the number of open files. For example, based on historical open file queries on client computer 120, client computer 130, and client computer 140 during the backup window of 3 am to 5 am, the estimated open files trajectories (using predictive analysis such as regression models), of these two clients could be in shapes such as those shown in FIG. 2.

In this example embodiment, the number of open files on client computer 120 is historically low between 4 am and 5 am (as shown in time diagram 220) while the number of open files on client computer 130 is historically low between 3 am and 4 am (as shown in time diagram 230). Data protection server 102 can leverage the temporal pattern estimations to schedule client computer 130's backup first and client computer 120's backup job later to reduce the overall number of open files encountered for both clients. In other words, embodiments of the present invention will leverage historical open file information of a client computer's operating system and make backup job scheduling decisions among multiple clients with common backup windows (i.e., client computer 120 and client computer 130), in order to reduce the number of open files encountered all together, or equivalently. In other example embodiments, the temporal pattern may be generated and supplied to data protection server 102 by a separate computer in distributed data processing environment 100.

Figure 3:
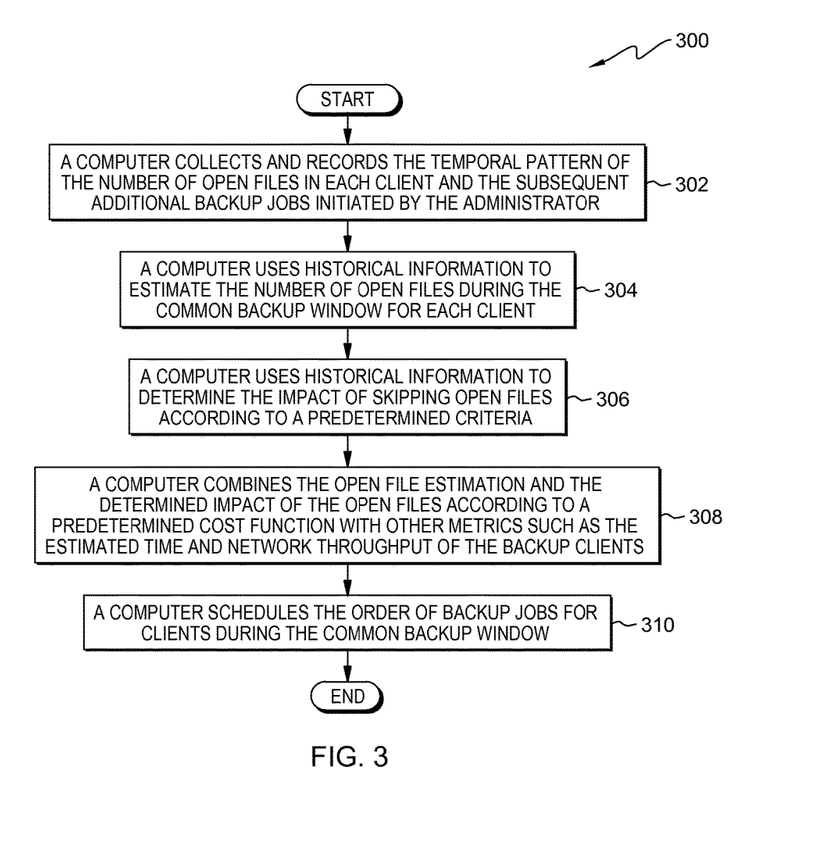
FIG. 3 is a flowchart illustrating operational steps of intelligent data protection, for clients within the data processing environment of FIG. 1, in an embodiment in accordance with the present invention.

FIG. 3 is a flowchart, generally designated 300, illustrating operational steps of intelligent data protection, for clients within the data processing environment of FIG. 1, in an embodiment in accordance with the present invention. Data protection server 102, using information collection module 116, collects and records historical information in the common backup window for client computer 120 and client computer 130, where the historical information includes a temporal pattern of a number of files open during previous backup jobs and information pertaining to subsequent additional backup jobs initiated by an administrator after the completion of the previous backup jobs, as depicted in step 302. Information collection module 116 queries the operating systems on client computer 120 and client computer 130 every 10 minutes to build an accurate temporal pattern estimation of the open files. For the example embodiment, information collection module 116 generates the temporal pattern by first determining the number of open files on client computer 120 and client computer 130 during the backup window between 3 am and 5 am. In this example embodiment, information collection module 116 determines the number of open files on client computer 120 via the Unix-like "lsof" command and via the freeware utility "OpenedFilesView" for Windows® systems on client computer 130. The temporal pattern of the number of open files on client computer 120 and client computer 130 is then stored in historical job logs 112. In another example embodiment, any software application may be used to collect and record the temporal pattern of the number of open files on client computer 120 and client computer 130, as well as the sequent additional backup jobs initiated by the administrator. In other example embodiments, information collection module 116 may reside or be part of another software application running on another computer system residing in distributed data processing environment 100.

In step 304, information collection module 116 uses historical information to estimate the number of open files during the common backup window for client computer 120 and client computer 130. In this example embodiment, data protection server 102 generates an estimation of the number of open files, by analyzing historical data collected from client computer 120 and client computer 130 over a period of seven days. Information collection module 116 additionally determines the number of times the individual files have been open throughout the seven day sampling period. In other example embodiments, the intervals at which information collection module 116 performs queries may be configurable at client computer 120, client computer 130, and client computer 140. For example, in some embodiments, a user may configure the information collection module 116 to perform queries at less frequent intervals, in order to retain a certain level of processing power for non-backup purposes. In other example embodiments, the open file queries by information collection module 116 may be paused or halted on client computer 120, client computer 130, and client computer 140 by a user.

In the example embodiment, historical information gathered from client computer 120 and client computer 130 during the common backup window between 3 am and 5 am, is used to calculate a basic open file summation to determine the number of open files encountered during backup. In this embodiment, the basic open file summation is determined using the following:

[nof client computer 120]+[nof client computer 130]

where nof indicates the number of open files on client computer 120, and nof indicates the number of open files on client computer 130.

Information collection module 116 then uses the historical information, stored in historical job logs 112, to infer the impact of skipping a backup of the open files during the common backup window for client computer 120 and client computer 130, where the impact is inferred from the historical information according to one or more predetermined criteria, as depicted in step 306. The predetermined criteria, for example, may be a defined rule determined by the backup administrator, such as by querying and recording information from client computer 120 and client computer 130 for a period of one week before analyzing data. The impact of open files on client computer 120, client computer 130, and client computer 140 is another factor that is taken into account for backup scheduling because not all open files are as equally important. For example, if one server contains important files that are updated and/or edited frequently, they are more likely to be open files, and therefore skipped by the scheduled backup jobs. As a result of this, the backup administrator usually issues one or more additional manually scheduled backup jobs after the scheduled job completes with x number of open files. For example, data protection server 102's activity logs will show that the scheduled (for example, daily) backup starts at 3 am and successfully completes at 3:38 am, with a total backup size of 2 Gigabytes (GB), and had 20 open files that were skipped by the backup process. In addition, data protection server 102's activity log shows that at 9 am, an additional manual backup job is issued by the backup administrator, and successfully completes at 9:20 am, with a total backup size 50 Megabytes (MB), with 2 open files. After that, another manual backup is issued at 9:40 am, with a total backup size 10 MB, and successfully completes with no open files. Such additional attempts may suggest that the skipped open files have a significant impact and subsequent manual backups must be issued due to the criticality of the system. Using this historical data, information collection module 116 estimates that the frequently encountered open files have historically been open during the scheduled backup window from 3 am to 5 am and therefore are critical to the system. In one example embodiment, the open file impact measurement for computer 120, client computer 130, and client computer 140 may be the number of subsequent manual backups, during the last three months, followed by successful backups with open files. In another example embodiment, the open file impact measurement for a certain client may be the number of subsequent manual backups followed by successful backup with open files more than a configurable threshold. In another example embodiment, the open file impact may be obtained by an assigned weight, or file importance, contained in the open file metadata information.

In step 308, information collection module 116 combines the open file estimations and the inferred impact of skipping the backup of the estimated number of open files during the common backup window for client computer 120 and client computer 130, according to a predetermined cost function with other metrics such as the estimated time and network throughput of client computer 120 and client computer 130. In one example embodiment, to prevent frequent changes of the backup schedules of client computer 120, client computer 130, and client computer 140, scheduling software 114 may re-evaluate the schedules for every predetermined time period (e.g., once a week), where the historical information of the past week will be used to determine the backup schedule and/or the predetermined backup time period of client computer 120, client computer 130, and client computer 140. Using the previous example embodiment, where the open file impact measurement for computer 120 and client computer 130 may be the number of subsequent manual backups, during the last three months, followed by successful backups with open files; suppose client computer 120's open file impact is a, and client computer 130's open file impact is b. A goal of the data protection server 102 is to make backup schedules that reduce the product of the open file impact and the number of open files encountered during a backup for client computer 120 plus the product of the open file impact and the number of open files encountered during a backup for client computer 130. The open file criticality metric is determined using the following:

[$a$*nof client computer 120]+[$b$*nof client computer 130]

where a indicates the open file impact on client computer 120, nof indicates the number of open files on client computer 120, b indicates the open file impact on client computer 130, and nof indicates the number of open files on client computer 130. In other words, it is a weighted version of the basic open file summation, where the weight of each client captures the inferred (client-specific) importance of backing up open files, or equivalently, the risk of skipping these open files. The open file criticality metric calculated above will be used to decide the backup schedule, optionally with additional performance metrics such as the time to complete one backup job. For example, the data protection server 102 can select the backup clients with common backup windows in a decreasing order of the following cost function:

$$\frac{a_x * \text{no } f \text{ during backup on client } x}{t_x}$$

where $a_x$ the inferred open file criticality for client x, nof indicates the number of open files on client computer x, and $t_x$ is the estimated backup duration given the size and network throughput estimation.

Referring still to step 308, scheduling software 114 determines the network throughput by converting the TCP window size of from bytes to bits (e.g., 64 KB*8=524,288 bits per second). Next the TCP window size in bits is divided by the network path latency (e.g., 524,288 bits per second/60 milliseconds=8,738.133 bits per second). Scheduling software 114 then stores the calculated network throughputs of client computer 120 and client computer 130 in historical job logs 112. In one example embodiment, the network throughput can be found on client computer 130 using the Windows® Task Manager, System Monitor, or with the "netstat" command line function. In another example embodiment using client computer 120, a command such as "ifstat" can be used to determine the network utilization. In other example embodiments, any commands native to the installed operating system may be used to determine the network throughput on client computers 120 and/or client computer 130 or any client device in distributed data processing environment 100. In another example embodiment, any software application or script may be used to determine the network throughput on client computers 120 and/or client computer 130 or any client device in distributed data processing environment 100.

Scheduling software 114 then schedules the order of one or more backup jobs for client computer 120 and client computer 130 during the common backup window to reduce the predetermined cost function as depicted in step 310. Scheduling software 114 uses the calculated weighted sum of all clients with a common backup window, and the number of open files weighted by their inferred impact metric determined above to schedule client computer 130 before client computer 120.

Figure 4:
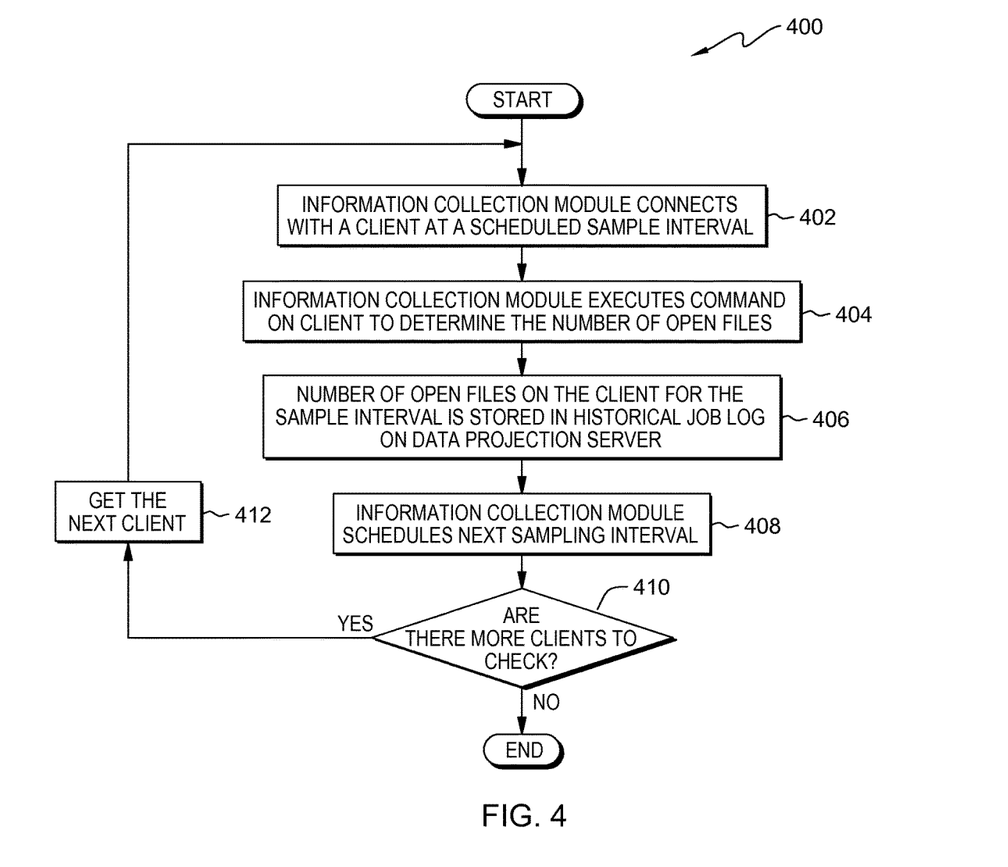
FIG. 4 is a flowchart depicting operational steps of determining open file temporal patterns, on client computers within the data processing environment of FIG. 1, in an embodiment in accordance with the present invention.

FIG. 4 is a flowchart, generally designated 400, depicting operational steps of determining open file temporal patterns, on client computers within the data processing environment of FIG. 1, in an embodiment in accordance with the present invention. Information collection module 116 establishes a connection to client computer 120 over a data connection on network 118 to perform a scheduled sampling of open files on client computer 120 as depicted in step 402. In one example embodiment, information collection module 116 may use a secure shell (SSH) connection to execute a remote command (e.g., "lsof"), to determine the number of open files on client computer 120. Secure Shell is a computer program to log into another computer over a network, to execute commands in a remote machine, and to move files from one machine to another. SSH provides strong authentication and secure communications over insecure channels. In another example embodiment, information collection module 116 may use other programs such as remote login (rlogin), or remote shell (rsh) to connect to client computer 120 and execute a remote commands. Remote login is a software utility for Unix-like computer operating systems that allows users to log in on another host via a network, communicating via transmission control protocol (TCP) port 513. Remote shell is a command line computer program that can execute shell commands as another user, and on another computer across a computer network via TCP port 514. In general, information collection module 116 may use any application program or protocol capable of connecting to, and determining the current number of open files, on client computer 120.

In step 404, information collection module 116, using a remote connection, executes a command on client computer 120 to determine the current number of open files. In one example embodiment, information collection module 116 may use any UNIX-like command to determine the current number of open files on client computer 120. In another example embodiment, a script may be used by information collection module 116 to determine the current number of open files on client computer 120. In general, any program or application that may determine the current number of open files on client computer 120 may be used by information collection module 116. In other example embodiments, a third computer may act as an information collector to determine the current number of open files on client computer 120 and other devices in distributed data processing environment 100.

In an example embodiment where the client OS does not provide such open file information, data protection server 102 may adopt a "probing" approach by first starting the backup of the client at 3 am on the $1^{st}$ day and record how many open files encountered. On the $2^{nd}$ day (assuming it is a daily backup with a backup window from 3 am to 5 am), data protection server 102 starts backup at 3:30 am and records how many open files encountered. After sufficient data is collected by data protection server 102 according to a predetermined criterion, e.g., ten consecutive days in which information has been gathered, the backup server can leverage collected historical information to estimate the temporal pattern of open files numbers.

Information collection module 116 stores the current number of open files found on client computer 120 for the scheduled sampling interval in historical job logs 112 located in persistent storage 108 as depicted in step 406. In addition to the current open files on client computer 120, information collection module 116 also parses the job logs to collect and record client-specific backup job information such as logs, metadata, the scheduled backup window, each backup job's start time and completion time, size of data transfer, the backup job outcome (i.e., success or failure), the number of open files skipped by the backup job, the average network throughput during backup, as well as the subsequent additional backup jobs issued by the backup admin (if any). In one example embodiment, historical job logs 112 may be any database or any organized collection of related data. In another example embodiment, historical job logs 112 may be stored in storage backend tiers 110. In another example embodiment, historical job logs 112 may be backed up to storage backend tiers 110. In other example embodiments, historical job logs 112 may be stored on one or more computer devices in distributed data processing environment 100.

In step 408, information collection module 116 schedules the next sampling interval for client computer 120. In computing, scheduling is the method by which threads, processes or data flows are given or granted access to system resources such as processor time, or communications bandwidth. In one example embodiment, the sampling intervals for information collection module 116 may be configurable by a user via a utility or graphical user interface on data protection server 102. In another example embodiment, the sampling intervals for information collection module 116 may be configurable by a user via a utility or graphical user interface on client computer 120. In other example embodiments, the sampling intervals for information collection module 116 may be configurable by a user via a Web interface, accessible from any computer device in distributed data processing environment 100.

In decision step 410, information collection module 116 checks to see if there are any more clients to check for open files. In one example embodiment, additional clients to be checked may be clients with the same backup window such as client computer 120, client computer 130, and client computer 140. In other example embodiments, the client computers may be stored in a list on data protection server 102, that information collection module 116 uses to check at a random or configurable intervals. Stated another way, information collection module 116 checks all client computers on the list for open files one at a time, or by spawning new threads for each client computer in the list. In computer science, a thread of execution is the smallest sequence of programmed instructions that can be managed independently by a scheduler, which is typically a part of the operating system.

If there are more client computers to check ("yes" branch, decision 410), information collection module 116 gets the next client on the list and repeats steps 402 through 408 as depicted in step 412. An example of this would be information collection module 116 closing the established connection to client computer 120, determining the next client in the list, then opening a new connection to client computer 130 and gathering information. If there are no more client computers to check ("no" branch, decision 410), information connection module releases any held resources of data protection server 102 and any devices in distributed data processing environment 100 and the thread execution ends.

Figure 5:
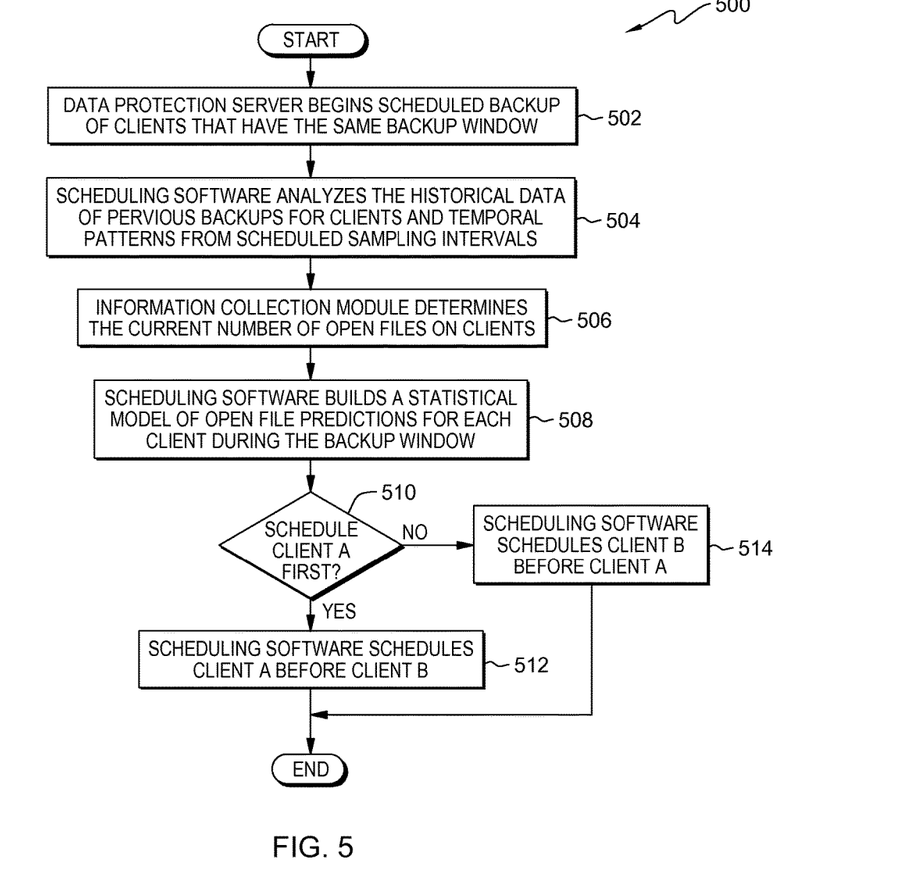
FIG. 5 is a flowchart depicting operational steps of a data protection server leveraging historical data of past backups and open file temporal patterns, on client computers within the data processing environment of FIG. 1, to determine the optimal time for a scheduled backup, in an embodiment in accordance with the present invention.

FIG. 5 is a flowchart, generally designated 500, depicting operational steps of a data protection server leveraging historical data of past backups and open file temporal patterns, on client computers within the data processing environment of FIG. 1, to determine the optimal time for a scheduled backup, in an embodiment in accordance with the present invention. In this example embodiment, data protection server 102 begins a scheduled backup of client computer 120 and client computer 130, where both clients are scheduled in the same backup window as depicted in step 502. In another example embodiment, there may be more than two client computers in the same scheduled backup window in distributed data processing environment 100.

In step 504, scheduling software 114 begins analyzing the historical data of previous backups, and the temporal patterns from scheduled sampling intervals for client computer 120 and client computer 130. Historical data is gathered by data protection server 102, scheduling software 114, and information collection module 116, which collect data from client computer 120 during scheduled backups. In addition to the targeted backup data, scheduling software 114 also analyzes client-specific backup job information such as logs and metadata, the scheduled backup window, the backup job's start time and completion time, the size of the data transfer, the outcome (e.g., success or failure), the number of open files encountered (thus skipped by the backup job), the average network throughput during backup, as well as the subsequent additional backup jobs issued by the backup admin (if any).

Scheduling software 114 also analyzes the temporal patterns from scheduled sampling intervals stored in historical job logs 112 to determine the impact of open files on client computer 120 and client computer 130. Scheduling software 114 does this by determining an open file criticality metric of the overall number of open files weighted by their corresponding inferred impact. Scheduling software 114 determines the open file criticality metric by first estimating the temporal patterns of the number of open files for client computer 120 and client computer 130, based on historical open file information in historical job logs 112. Scheduling software 114 can then perform optimization methods to reduce the open file criticality metric. In one example embodiment, scheduling software 114 compares the schedules of "client computer 120 before client computer 130" with "client computer 130 before client computer 120" and chooses the schedule with the smaller value of the open file criticality metric. In other example embodiments, other advanced optimization methods such as client-level backup throttling by applying differentiated level of parallelism across clients may be deployed.

Information collection module 116 then determines the current number of open files on client computer 120 and client computer 130 as depicted in step 506. Information collection module 116 establishes a connection to client computer 120 and client computer 130 over a data connection on network 118 to query the operating systems to determine the current number of open files. On client computer 120, information collection module 116 issues the UNIX-like "lsof" command and the Windows® "OpenedFilesView" on client 130. Information collection module 116 then determines a cost function by using the determined current number of open files of client computer 120 and client computer 130, the open file criticality metric of client computer 120 and client computer 130, and the estimated backup duration given the size and network throughput estimation for client computer 120 and client computer 130 stored in historical job logs 112. In one example embodiment, the open file criticality metrics may be configurable values set by the backup administrator, or by users of client computer 120 and client computer 130, or any client device in distributed data processing environment 100.

In step 508, scheduling software 114 builds a statistical model of open file predictions of client computer 120 and client computer 130 during the backup window based on the calculated cost functions and illustrated in FIG. 2. Scheduling software 114 then uses the temporal pattern estimation to determine the backup order in the common backup window of client computer 120 and client computer 130. The methods of the example embodiments, may also be used to provide a data protection service in a Cloud based or Internet environment.

In decision step 510, scheduling software 114 orders the backup order of client computer 120 and client computer 130 based on the open file impact predictions, where the client with the least open file impact is scheduled first. If the calculated cost functions and statistical models determine that client computer 120 has a lower open file impact prediction than client computer 130 ("yes" branch, decision 510), scheduling software 114 schedules client computer 120 before client computer 130 in the common backup window of 3 am to 5 am as depicted in step 512. If the calculated cost functions and statistical models determine that client computer 120 has a higher open file impact prediction than client computer 130 ("no" branch, decision 510), scheduling software 114 schedules client computer 130 before client computer 120 in the common backup window of 3 am to 5 am as depicted in step 514.

Figure 6:
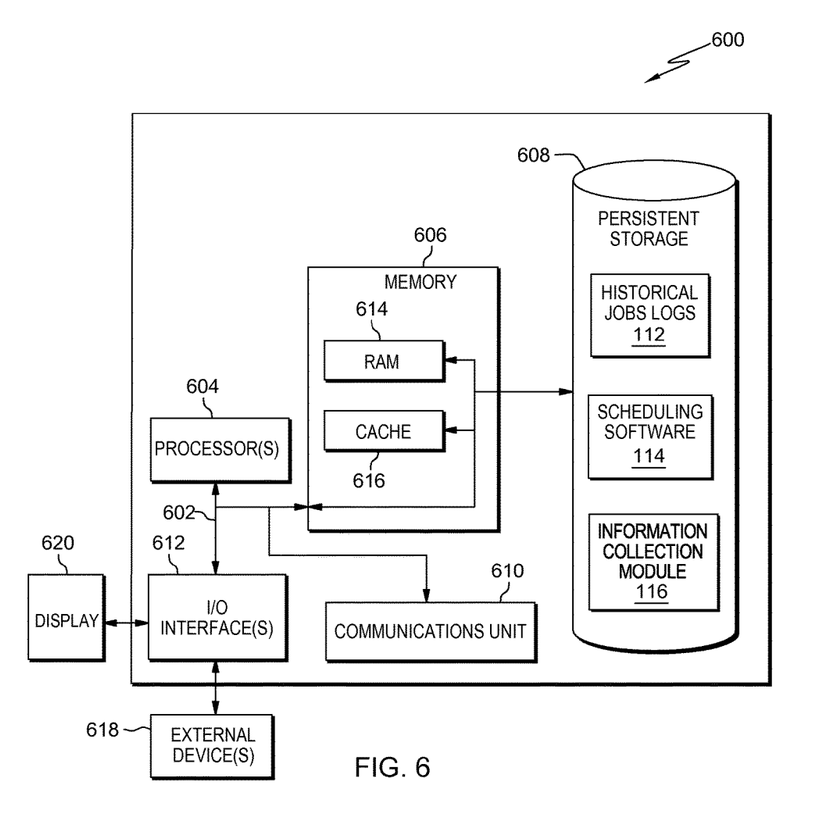
FIG. 6 depicts a block diagram of components of the data protection server computer executing the information collection module, scheduling software, and historical job logs, in an embodiment in accordance with the present invention.

FIG. 6 depicts a block diagram, generally designated 600, of components of the data protection server computer executing the information collection module, scheduling software, and historical job logs, in an embodiment in accordance with the present invention. It should be appreciated that FIG. 6 provides only an illustration of one implementation and does not imply any limitations with regard to the environments in which different embodiments may be implemented. Many modifications to the depicted environment may be made.

Data protection server 102 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

Historical job logs 112, scheduling software 114, and information collection module 116 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of network 118 and client computer 120, client computer 130, and client computer 140. In these examples, communications unit 610 includes one or more network interface cards. Communications unit 610 may provide communications through the use of either or both physical and wireless communications links. Historical job logs 112, scheduling software 114, and information collection module 116 may be downloaded to persistent storage 608 through communications unit 610.

I/O interface(s) 612 allows for input and output of data with other devices that may be connected to data protection server 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., historical job logs 112, scheduling software 114, and information collection module 116, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    collecting and recording, by one or more processors, historical information pertaining to one or more backup jobs for a plurality of backup clients with a common backup window, wherein the historical information includes a temporal pattern of a number of files open during previous backup jobs and information pertaining to subsequent backup jobs initiated by an administrator after the completion of the previous backup jobs;
    for each of the plurality of backup clients:
        estimating, by one or more processors, a number of files to be open during the common backup window based, at least in part, on the historical information,
        determining, by one or more processors, a number indicating how many subsequent backup jobs were initiated by the administrator after the completion of scheduled backup jobs of the files estimated to be open during the common backup window,
        inferring, by one or more processors, an impact of skipping a backup of the files estimated to be open during the common backup window, where the impact is inferred from the historical information according to one or more predetermined criteria, wherein the one or more predetermined criteria include the determined number indicating how many subsequent backup jobs were initiated by the administrator after the completion of scheduled backup jobs of the files estimated to be open during the common backup window, and
        combining, by one or more processors according to a predetermined cost function, the estimated number of files to be open during the common backup window and the inferred impact of skipping the backup of the estimated number of files to be open during the common backup window; and
    scheduling, by one or more processors, an order of the one or more backup jobs among the plurality of clients during the common backup window to reduce an overall impact of skipping backups of files estimated to be open during the common backup window, based on the combining according to the predetermined cost function for each of the plurality of backup clients.

2. The method of claim 1, wherein collecting and recording historical information pertaining to one or more backup jobs for a plurality of backup clients with a common backup window further comprises:

querying, by one or more processors, one or more of the clients during the previous backup jobs to record the number of files open during the previous backup jobs; and identifying, by one or more processors, the temporal pattern based, at least in part, on the recorded number of files open during the previous backup jobs.

3. The method of claim 1, wherein the predetermined cost function is based, at least in part, on one of the following:

the number of files estimated to be open during the common backup window weighted by an inferred impact metric;

an estimated time to complete the one or more backup jobs of one or more of the clients; and a network throughput during the one or more backup jobs of one or more of the clients.

4. The method of claim 1, wherein scheduling an order of the one or more backup jobs among the plurality of clients during the common backup window to reduce an overall impact of skipping backups of files estimated to be open during the common backup window, based on the combining according to the predetermined cost function for each of the plurality of backup clients further comprises:

determining, by one or more processors, a backup time during the common backup window;

determining, by one or more processors, a weight for each of the one or more backup jobs at the backup time based, at least in part, on the predetermined cost function; and selecting, by one or more processors, a backup job to run at the backup time based, at least in part, on its corresponding weight.

5. The method of claim 2, wherein the querying of one or more of the clients during the previous backup jobs is initiated by a computer program thread for each of the one or more of the clients.

6. The method of claim 5, wherein querying is initiated according to a schedule.

7. The method of claim 1, wherein inferring an impact of skipping the backup of the files estimated to be open during the common backup window, where the impact is inferred from the historical information according to one or more predetermined criteria further comprises:

determining, by one or more processors, an amount of importance for at least one of the files estimated to be open during the common backup window, wherein the amount of importance is based on the following:

whether the file has been updated and/or edited frequently;

whether the file has frequently been open or in use, according to the historical information; and whether the file has been backed up during one or more of the subsequent backup jobs initiated by the administrator.

8. A computer program product comprising:

one or more computer readable storage media and program instructions stored on the one or more computer readable storage media, the program instructions comprising:

program instructions to collect and record historical information pertaining to one or more backup jobs for a plurality of backup clients with a common backup window, wherein the historical information includes a temporal pattern of a number of files open during previous backup jobs and information pertaining to subsequent backup jobs initiated by an administrator after the completion of the previous backup jobs;

for each of the plurality of backup clients:

program instructions to estimate a number of files to be open during the common backup window based, at least in part, on the historical information, program instructions to determine a number indicating how many subsequent backup jobs were initiated by the administrator after the completion of scheduled backup jobs of the files estimated to be open during the common backup window, program instructions to infer an impact of skipping a backup of the files estimated to be open during the common backup window, where the impact is inferred from the historical information according to one or more predetermined criteria, wherein the one or more predetermined criteria include the determined number indicating how many subsequent backup jobs were initiated by the administrator after the completion of scheduled backup jobs of the files estimated to be open during the common backup window, and program instructions to combine according to a predetermined cost function, the estimated number of files to be open during the common backup window and the inferred impact of skipping the backup of the estimated number of files to be open during the common backup window; and program instructions to schedule an order of the one or more backup jobs among the plurality of clients during the common backup window to reduce an overall impact of skipping backups of files estimated to be open during the common backup window, based on the combining according to the predetermined cost function for each of the plurality of backup clients.

9. The computer program product of claim 8, wherein collecting and recording historical information pertaining to one or more backup jobs for a plurality of backup clients with a common backup window further comprises:

program instructions to query one or more of the clients during the previous backup jobs to record the number of files open during the previous backup jobs; and program instructions to identify the temporal pattern based, at least in part, on the recorded number of files open during the previous backup jobs.

10. The computer program product of claim 8, wherein the predetermined cost function is based, at least in part, on one of the following:

the number of files estimated to be open during the common backup window weighted by an inferred impact metric;

an estimated time to complete the one or more backup jobs of one or more of the clients; and a network throughput during the one or more backup jobs of one or more of the clients.

11. The computer program product of claim 8, wherein scheduling an order of the one or more backup jobs among the plurality of clients during the common backup window to reduce an overall impact of skipping backups of files estimated to be open during the common backup window, based on the combining according to the predetermined cost function for each of the plurality of backup clients further comprises:

program instructions to determine a backup time during the common backup window;

program instructions to determine a weight for each of the one or more backup jobs at the backup time based, at least in part, on the predetermined cost function; and program instructions to select a backup job to run at the backup time based, at least in part, on its corresponding weight.

12. The computer program product of claim 9, wherein the querying of one or more of the clients during the previous backup jobs is initiated by a computer program thread for each of the one or more of the clients.

13. The computer program product of claim 12, wherein querying is initiated according to a schedule.

14. The computer program product of claim 8, wherein inferring an impact of skipping the backup of the files estimated to be open during the common backup window, where the impact is inferred from the historical information according to one or more predetermined criteria further comprises:
program instructions to determine an amount of importance for at least one of the files estimated to be open during the common backup window, wherein the amount of importance is based on the following:
whether the file has been updated and/or edited frequently;
whether the file has frequently been open or in use, according to the historical information; and
whether the file has been backed up during one or more of the subsequent backup jobs initiated by the administrator.

15. A computer system comprising:
one or more computer processors;
one or more computer readable storage media;
program instructions stored on the computer readable storage media for execution by at least one of the one or more processors, the program instructions comprising:
program instructions to collect and record historical information pertaining to one or more backup jobs for a plurality of backup clients with a common backup window, wherein the historical information includes a temporal pattern of a number of files open during previous backup jobs and information pertaining to subsequent backup jobs initiated by an administrator after the completion of the previous backup jobs;
for each of the plurality of backup clients:
program instructions to estimate a number of files to be open during the common backup window based, at least in part, on the historical information,
program instructions to determine a number indicating how many subsequent backup jobs were initiated by the administrator after the completion of scheduled backup jobs of the files estimated to be open during the common backup window,
program instructions to infer an impact of skipping a backup of the files estimated to be open during the common backup window, where the impact is inferred from the historical information according to one or more predetermined criteria, wherein the one or more predetermined criteria include the determined number indicating how many subsequent backup jobs were initiated by the administrator after the completion of scheduled backup jobs of the files estimated to be open during the common backup window, and
program instructions to combine according to a predetermined cost function, the estimated number of files to be open during the common backup window and the inferred impact of skipping the backup of the estimated number of files to be open during the common backup window; and
program instructions to schedule an order of the one or more backup jobs among the plurality of clients during the common backup window to reduce an overall impact of skipping backups of files estimated to be open during the common backup window, based on the combining according to the predetermined cost function for each of the plurality of backup clients.

16. The computer system of claim 15, wherein collecting and recording historical information pertaining to one or more backup jobs for a plurality of backup clients with a common backup window further comprises:
program instructions to query one or more of the clients during the previous backup jobs to record the number of files open during the previous backup jobs; and
program instructions to identify the temporal pattern based, at least in part, on the recorded number of files open during the previous backup jobs.

17. The computer system of claim 15, wherein scheduling an order of the one or more backup jobs among the plurality of clients during the common backup window to reduce an overall impact of skipping backups of files estimated to be open during the common backup window, based on the combining according to the predetermined cost function for each of the plurality of backup clients further comprises:
program instructions to determine a backup time during the common backup window;
program instructions to determine a weight for each of the one or more backup jobs at the backup time based, at least in part, on the predetermined cost function; and
program instructions to select a backup job to run at the backup time based, at least in part, on its corresponding weight.

18. The computer system of claim 16, wherein the querying of one or more of the clients during the previous backup jobs is initiated by a computer program thread for each of the one or more of the clients.

19. The computer system of claim 15, wherein inferring an impact of skipping the backup of the files estimated to be open during the common backup window, where the impact is inferred from the historical information according to one or more predetermined criteria further comprises:
program instructions to determine an amount of importance for at least one of the files estimated to be open during the common backup window, wherein the amount of importance is based on the following:
whether the file has been updated and/or edited frequently;
whether the file has frequently been open or in use, according to the historical information; and
whether the file has been backed up during one or more of the subsequent backup jobs initiated by the administrator.

20. The computer system of claim 15, wherein the predetermined cost function is based, at least in part, on one of the following:
the number of files estimated to be open during the common backup window weighted by an inferred impact metric;
an estimated time to complete the one or more backup jobs of one or more of the clients; and
a network throughput during the one or more backup jobs of one or more of the clients.

* * * * *